United States Patent
Winters et al.

(10) Patent No.: US 10,069,733 B2
(45) Date of Patent: Sep. 4, 2018

(54) MANAGING ETHERNET BACKPRESSURE AT A NETWORK DEVICE

(71) Applicant: ARRIS Enterprises LLC, Suwanee, GA (US)

(72) Inventors: Derek Alan Winters, Suwanee, GA (US); Peter Sadrozinski, Suwanee, GA (US)

(73) Assignee: ARRIS Enterprises LLC, Suwanee, GA (US)

(*) Notice: Subject to any disclaimer, the term of this patent is extended or adjusted under 35 U.S.C. 154(b) by 64 days.

(21) Appl. No.: 15/247,369

(22) Filed: Aug. 25, 2016

(65) Prior Publication Data

US 2017/0063707 A1   Mar. 2, 2017

Related U.S. Application Data (60) Provisional application No. 62/210,698, filed on Aug. 27, 2015.

(51) Int. Cl.
*H04L 12/801* (2013.01)
*H04L 12/825* (2013.01)
*H04L 12/24* (2006.01)
*H04L 12/26* (2006.01)

(52) U.S. Cl.
CPC ............... *H04L 47/11* (2013.01); *H04L 41/12* (2013.01); *H04L 43/0894* (2013.01); *H04L 43/16* (2013.01); *H04L 47/12* (2013.01); *H04L 47/26* (2013.01)

(58) Field of Classification Search
None
See application file for complete search history.

(56) References Cited

U.S. PATENT DOCUMENTS

| | | | | |
|---|---|---|---|---|
| 8,018,851 | B1 * | 9/2011 | Medina | H04L 47/10 370/235 |
| 2003/0218977 | A1 * | 11/2003 | Pan | H04L 43/00 370/230 |
| 2011/0080834 | A1 * | 4/2011 | Hirota | H04L 47/10 370/236 |

* cited by examiner

*Primary Examiner* — Yaotang Wang
(74) *Attorney, Agent, or Firm* — Bart A. Perkins (57) ABSTRACT

Methods, systems, and computer readable media can be operable to facilitate a dynamic control of a pause frame setting at a network device. A network node may monitor for and detect a link or speed change occurring at an interface. When a link or speed change is detected, the network node may take an inventory of one or more links at an associated switch. If at least one of the one or more links are high speed links, the network node may disable the output of pause frames from the network node. If none of the one or more links are high speed links, the network node may enable the output of pause frames from the network node.

20 Claims, 4 Drawing Sheets

MANAGING ETHERNET BACKPRESSURE AT A NETWORK DEVICE

CROSS REFERENCE TO RELATED APPLICATION

This application is a non-provisional application claiming the benefit of U.S. Provisional Application Ser. No. 62/210,698, entitled "Managing Ethernet Backpressure in Network Device," which was filed on Aug. 27, 2015, and is incorporated herein by reference in its entirety.

TECHNICAL FIELD

This disclosure relates to the management of Ethernet backpressure at a network device.

BACKGROUND

Increases in data transfer rates throughout a network may lead to unexpected issues when network components are not configured to handle the increased speeds. For example, existing customer premise equipment (CPE) may be upgraded with a top-tier configuration file from, for example, 100 Mbps to 300 Mbps, however, as a result of the upgrade, throughput at legacy devices (e.g., legacy 100Base-T Ethernet gear) may have their throughput drop while using TCP (transmission control protocol) applications. This issue can result from a network problem that occurs when a big pipe meets a little pipe (e.g., a 300 Mbps pipe flowing into a 100 Mbps pipe). For example, the situation may arise where more than 100 Mbps of network traffic ingresses into an Ethernet switch and the only egress is a 100 Mbps port. Thus, the Ethernet switch is forced to drop packets internally once its internal buffers are exhausted. These dropped packets result in the TCP receiver repeatedly acknowledging the last received segment until the sender detects this and determines there is a congestion situation. TCP will take over and start adjusting the transmission down to automatically avoid congestion. In this case it ends up adjusting the transmission down to a point where the entire link is not optimally used. The bursty DOCSIS (data over cable service interface specification) upstream combined with the buffer depth in the switch itself may lead to the observed issues.

This is a situation that can be alleviated if the network could be informed of backpressure using pause frames which are defined by the 802.3x standard. With pause frames enabled in the switch, when it detects that it is out of buffers it can send pause frames back toward the big pipe and those frames tell the big pipe to stop transmitting for a specified amount of time. However, there is a downside to pause frames and that is head-of-line blocking. Pause frames go back up the GigE port of the external switch into the modem's internal layer-2 switch. These pause frames tell the layer-2 switch to stop transmitting on that port for a predetermined or specified time. This causes the layer-2 switch to buffer packets until it runs out of buffers. Backpressure is then realized in the DOCSIS layer when the switch sees that the layer-2 switch buffers are exhausted. DOCSIS will then start buffering the data packets. The problem is that all data flows going through the layer-2 switch of the modem are slowed down, which is used to connect various other interfaces such as Ethernet, MoCA (multimedia over coax alliance), Wi-Fi, and others. Therefore, a need exists for improving methods and systems for dynamically controlling the output of pause frames.

BRIEF DESCRIPTION OF THE DRAWINGS

Like reference numbers and designations in the various drawings indicate like elements.

DETAILED DESCRIPTION

It is desirable to improve upon methods and systems for dynamically controlling the output of pause frames. Methods, systems, and computer readable media can be operable to facilitate a dynamic control of a pause frame setting at a network device. A network node may monitor for and detect a link or speed change occurring at an upstream interface. When a link or speed change is detected, the network node may take an inventory of one or more links at an associated external switch. If at least one of the one or more links are high speed links, the network node may disable the output of pause frames from the network node. If none of the one or more links are high speed links, the network node may enable the output of pause frames from the network node.

An embodiment of the invention described herein may include a method for controlling a pause frame setting at a network node, the method comprising: (a) identifying each of one or more links of a switch associated with the network node; (b) determining a speed associated with each of the identified one or more links; (c) if at least one link of the identified one or more links is associated with a speed that is higher than a threshold, disabling an output of pause frames from the network node; and (d) if no link of the identified one or more links is associated with a speed that is higher than the threshold, enabling an output of pause frames from the network node.

According to an embodiment of the invention, the method described herein further comprises: (a) detecting a link change at an interface of the network node; and (b) wherein each of the one or more links of the external switch are identified in response to the detection of the link change at the interface of the network node.

According to an embodiment of the invention, the method described herein further comprises: (a) detecting a speed change at an interface of the network node; and (b) wherein each of the one or more links of the external switch are identified in response to the detection of the speed change at the interface of the network node.

According to an embodiment of the invention, the interface of the network node comprises an upstream Ethernet port.

According to an embodiment of the invention, the one or more links of the switch associated with the network node comprise one or more links between the network node and one or more downstream nodes.

According to an embodiment of the invention, the switch associated with the network node comprises an external switch.

An embodiment of the invention described herein may include a network node comprising one or more modules configured to: (a) identify each of one or more links of a switch associated with the network node; (b) determine a speed associated with each of the identified one or more links; (c) if at least one link of the identified one or more links is associated with a speed that is higher than a threshold, disable an output of pause frames from the network node; and (d) if no link of the identified one or more links is associated with a speed that is higher than the threshold, enable an output of pause frames from the network node.

According to an embodiment of the invention, the one or more modules are further configured to: (a) detect a link change at an interface of the network node; and (b) wherein each of the one or more links of the switch are identified in response to the detection of the link change at the interface of the network node.

According to an embodiment of the invention, the one or more modules are further configured to: (a) detect a speed change at an interface of the network node; and (b) wherein each of the one or more links of the switch are identified in response to the detection of the speed change at the interface of the network node.

An embodiment of the invention described herein may include one or more non-transitory computer readable media having instructions operable to cause one or more processors to perform the operations comprising: (a) identifying each of one or more links of a switch associated with the network node; (b) determining a speed associated with each of the identified one or more links; (c) if at least one link of the identified one or more links is associated with a speed that is higher than a threshold, disabling an output of pause frames from the network node; and (d) if no link of the identified one or more links is associated with a speed that is higher than the threshold, enabling an output of pause frames from the network node.

According to an embodiment of the invention, the instructions are further operable to cause one or more processors to perform the operations comprising: (a) detecting a link change at an interface of the network node; and (b) wherein each of the one or more links of the switch are identified in response to the detection of the link change at the interface of the network node.

According to an embodiment of the invention, the instructions are further operable to cause one or more processors to perform the operations comprising: (a) detecting a speed change at an interface of the network node; and (b) wherein each of the one or more links of the switch are identified in response to the detection of the speed change at the interface of the network node.

Figure 1:
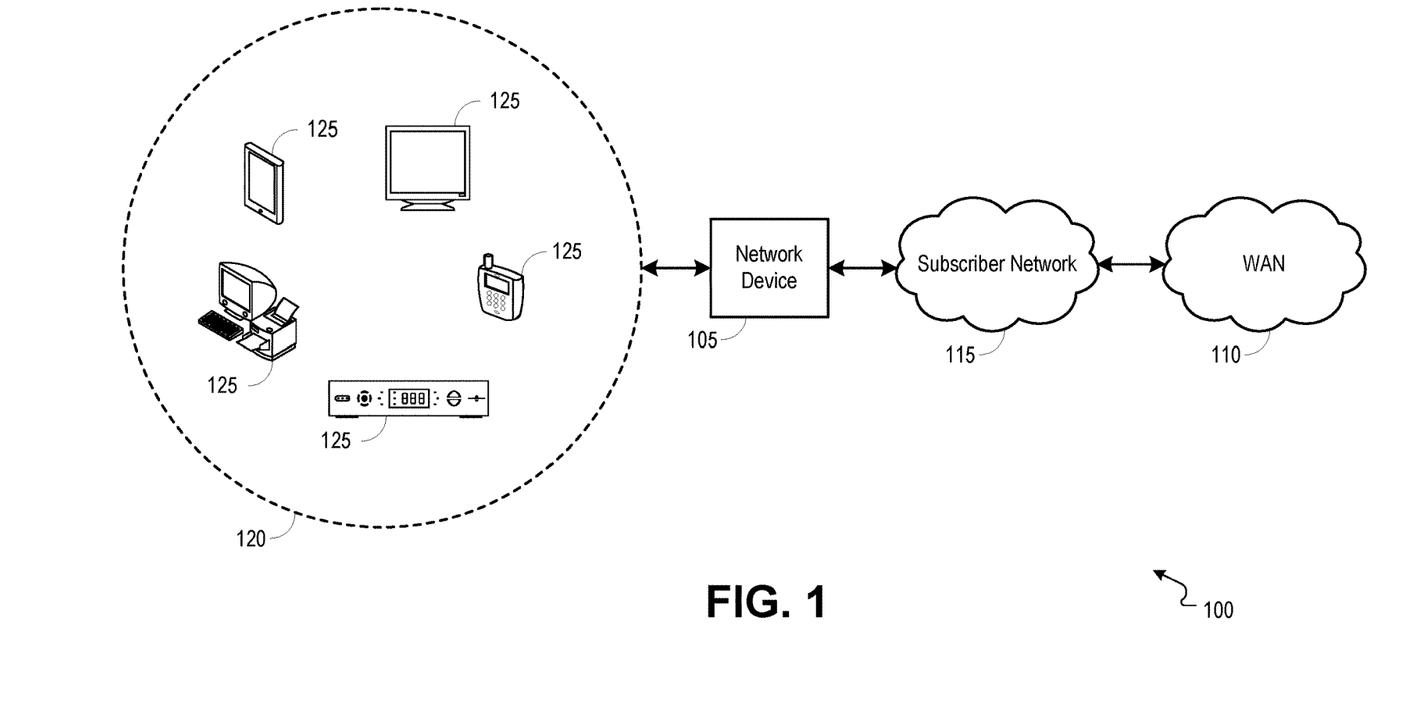
FIG. 1 is a block diagram illustrating an example network environment operable to facilitate a dynamic control of a pause frame setting at a network device.

FIG. 1 is a block diagram illustrating an example network environment 100 operable to facilitate a dynamic control of a pause frame setting at a network device. In embodiments, a network device 105 may provide video, audio, data, and/or other services to a subscriber by communicating with a wide area network (WAN) 110 through a connection to a subscriber network 115 (e.g., hybrid fiber-coaxial network, fiber network, cellular network, high speed data network, etc.). For example, the network device 105 may be configured to provide communication delivery services to one or more subscriber networks or devices such as communication routing services, switching services, and/or others. The network device 105 may include a gateway device, a broadband modem, a wireless router including an embedded modem, a switch, or any other network node, device, or access point operable to route communications between one or more client devices and a network or network element/node. The network device 105 may provide a local network 120 for delivering services to one or more client devices 125. The local network 120 may include a local area network (LAN), wireless local area network (WLAN), personal area network (PAN), Multimedia over Coax Alliance (MoCA) network, mobile hotspot network, and others.

A subscriber can request, receive and interact with multimedia and/or data services through a client device 125. A client device 125 may include a gateway device, set-top box (STB), computer, mobile device, tablet, television, and any other device operable to receive multimedia and/or data services. Multimedia and/or data services may be received at a client device 125 through a connection to a network device 105. While the components shown in FIG. 1 are shown separate from each other, it should be understood that the various components can be integrated into each other.

The network device 105 may provide a WLAN for client devices 125 within range of the central device 105 (or within range of an access point or wireless extender configured to route communications between the central device 105 and client devices 125), and multimedia and/or data services may be provided to client devices 125 through wireless communications (e.g., Wi-Fi) and/or wired communications (e.g., Ethernet).

In embodiments, the network device 105 may output a pause frame to an upstream network component. For example, when pause frames are enabled at a network node, such as a switch, the network node may send a pause frame to a sender (e.g., node that is sending data to the network node) when the network node detects that it is out of buffers. The sender may be situated at the other end of a link from the network node and may be configured within a communication network such that greater bandwidth is available to the sender than the network node. The pause frame may request that the sender stop transmitting to the network node for a specified or predetermined amount of time.

In embodiments, the network device 105 may detect a link or speed change occurring on an upstream or downstream interface (e.g., an Ethernet port). For example, the network device 105 may detect a link or speed change at an interface based upon communications received from an upstream or downstream node through the interface. When the link or speed change is detected, the network device 105 may take an inventory of all links of an associated external switch (e.g., downstream external switch connecting one or more downstream nodes to the network device 105 or an upstream external switch connecting the network device 105 to one or more upstream nodes). For example, the network device 105 may identify each link supported at the external switch and may determine whether any of the one or more links are high speed links (e.g., gigabit Ethernet (GigE) or other link classified by the network device 105 as a high speed link). If the network device 105 determines that at least one high speed link is supported at the external switch, the network device 105 may disable the output of pause frames from the network device 105. If the network device 105 determines that no high speed link is supported at the external switch, the network device 105 may enable the output of pause frames from the network device 105. Thus, high speed devices are given precedence over other non-high speed devices that are communicating through the network device 105.

It should be understood that the configuration of a pause frame setting at the network device 105 may be expanded if the proper internal metrics are determined inside the network device 105. For example, the network device 105 may be configured to inventory MoCA (multimedia over coax alliance) and Wi-Fi connections and determine near-term bandwidth usage relative to capability.

Figure 2:
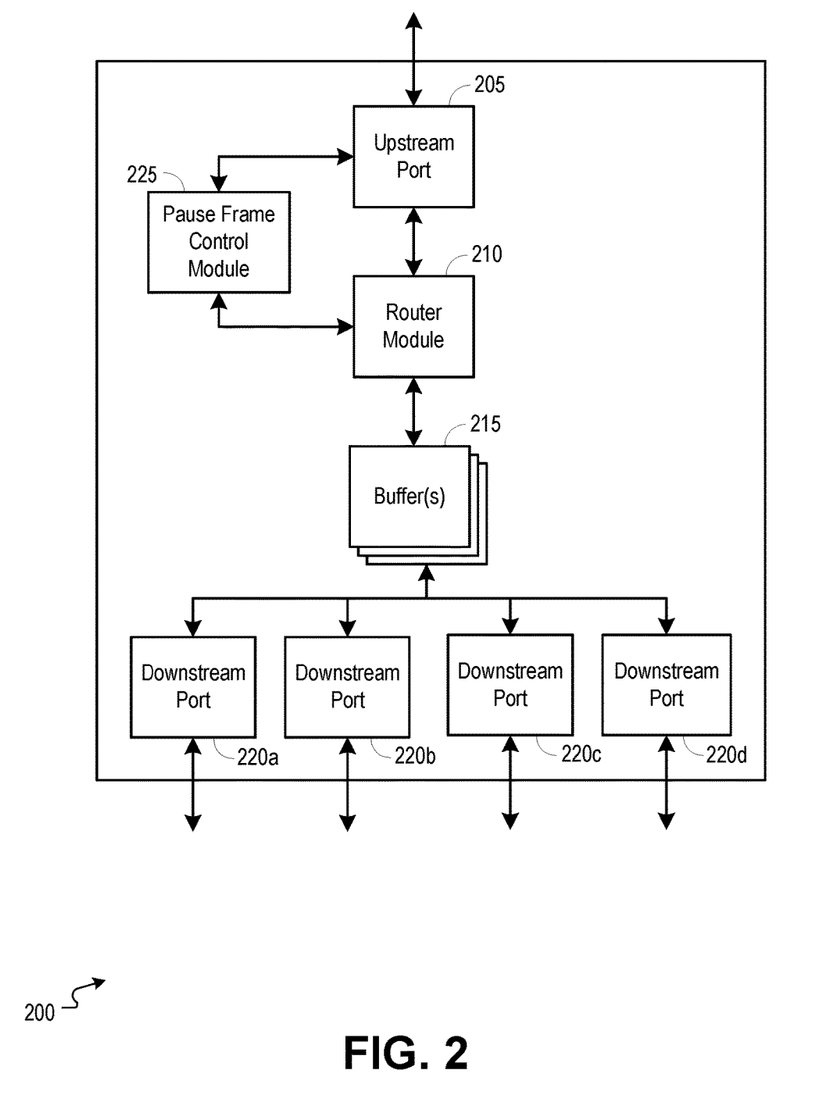
FIG. 2 is a block diagram illustrating an example communication routing system operable to facilitate a dynamic configuration of a pause frame setting.

FIG. 2 is a block diagram illustrating an example communication routing system 200 operable to facilitate a dynamic configuration of a pause frame setting. In embodiments, the routing system 200 may include an upstream port 205, a router module 210, one or more buffers 215, one or more downstream ports 220a-d, and a pause frame control module 225. The routing system 200 may reside as one or more components within a network device 105 of FIG. 1, and the network device 105 may be a device that is located within a subscriber premise, at a network headend, or within a network that delivers/routes communications between a headend and one or more subscriber premises. In embodiments, the components of the communication routing system 200 may exist as separate components or devices that are configured to communicate with each other.

In embodiments, the network device 105 may output a pause frame to an upstream network component. For example, when pause frames are enabled at a network node, such as a switch, the network node may send a pause frame to a sender (e.g., node that is sending data to the network node) when the network node detects that it is out of buffers. The sender may be situated at the other end of a link from the network node and may be configured within a communication network such that greater bandwidth is available to the sender than the network node. The pause frame may request that the sender stop transmitting to the network node for a specified or predetermined amount of time.

In embodiments, the pause frame control module 225 may detect a link or speed change occurring on an upstream port 205 (e.g., an Ethernet port) or downstream port 220a-d (e.g., Ethernet port). When the link or speed change is detected, the pause frame control module 225 may take an inventory of all links of an associated switch (e.g., the switch may include the downstream ports 220a-d). For example, the pause frame control module 225 may identify each link supported at the switch and may determine whether any of the one or more links are high speed links (e.g., gigabit Ethernet (GigE) or other link classified as a high speed link). If the pause frame control module 225 determines that at least one high speed link is supported at the switch, the pause frame control module 225 may disable the output of pause frames from the communication routing system 200.

If the pause frame control module 225 determines that no high speed link is supported at the switch, the pause frame control module 225 may enable the output of pause frames from the communication routing system 200. In embodiments, when the pause frame module 225 enables the output of pause frames, the routing module 210 may output a pause frame through the upstream port 205 to a sending node when one or more of the buffers 215 are filled or otherwise become congested beyond a predetermined level. For example, the routing module 210 may buffer packets at one or more of the buffers 215 for output to a target device through one or more of the downstream ports 220a-d, and when one or more of the buffers 215 are filled or otherwise congested, the routing module 210 may output a pause frame to a sending node, wherein the pause frame requests that the sending node stop transmitting to the communication routing system 200 or to a specific device receiving content through a specific downstream port 220a-d that is effected by the filled or congested buffer(s).

Figure 3:
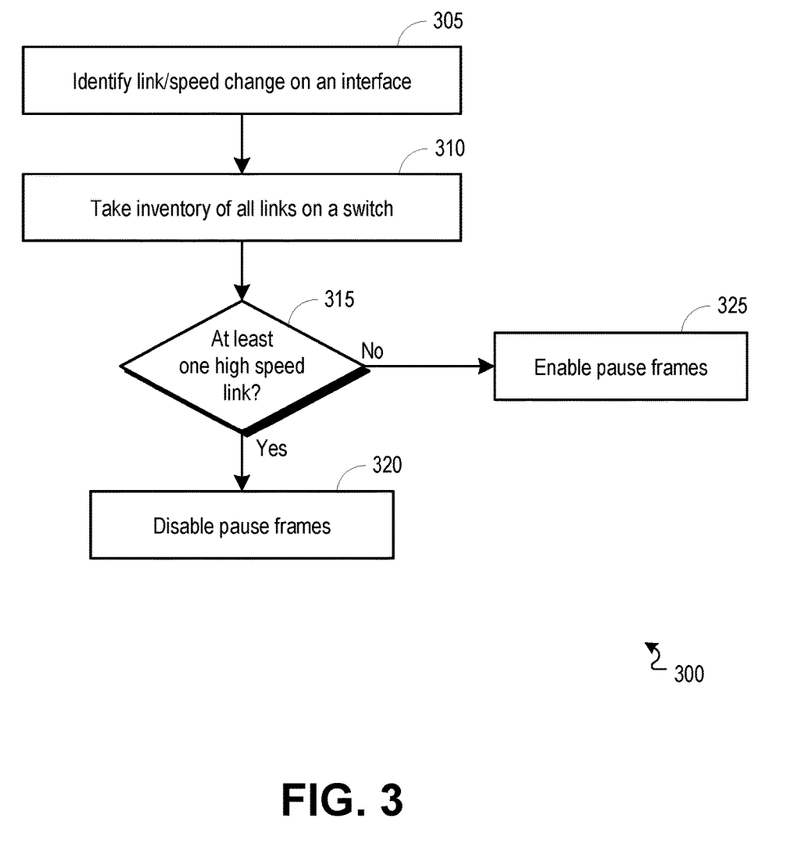
FIG. 3 is a flowchart illustrating an example process operable to facilitate a dynamic control of a pause frame setting at a network device.

FIG. 3 is a flowchart illustrating an example process 300 operable to facilitate a dynamic control of a pause frame setting at a network device. The process 300 may be carried out by a network device 105 of FIG. 1 or system 200 of FIG. 2 while delivering one or more services to one or more devices or networks (e.g., client devices 125 of FIG. 1). The process 300 may begin at 305 when a link/speed change is identified at an interface. In embodiments, the link/speed change may be identified at an upstream port 205 of FIG. 2 or a downstream port 220a-d of FIG. 2 by a pause frame control module 225 of FIG. 2. For example, the link/speed change may be an increase in the speed at which communications (e.g., packets) are received at the upstream port 205 or are output over a downstream port 220a-d.

At 310, an inventory may be taken of each link of a switch. For example, the pause frame control module 225 may identify a communication link that is supported through each of one or more downstream interfaces (e.g., downstream ports 220a-d of FIG. 2). The one or more links may be links of an associated switch and may include one or more links between the network device 105 and one or more downstream nodes. In embodiments, the pause frame control module 225 may identify one or more device types that are communicating over each link and/or may identify a data speed supported by each link and the one or more devices communicating over the link.

At 315, a determination may be made whether at least one high speed link is supported by the switch. The determination whether at least one high speed link is supported by the switch, may be made, for example, by the pause frame control module 225. In embodiments, the pause frame control module 225 may identify a link as a high speed link when the link supports a data speed that is higher than a threshold speed. For example, a link supporting speeds above 100 Mbps may be classified as a high speed link. It should be understood that the threshold controlling the classification of a link as a high speed link may be adjusted according to advancements in technology that make possible higher data speeds. For example, a network device 105 may be configured with a parameter that establishes the predetermined speed threshold, and this parameter may be updated by a user, technician, content/service provider, or other entity.

If, at 315, the determination is made that at least one high speed link is supported by the switch, the process 300 may proceed to 320. At 320, pause frames may be disabled. The transmission of pause frames may be disabled at a network device 105 or system 200, for example, by a pause frame control module 225. In embodiments, the pause frame control module 225 may disable a pause frame setting, thereby precluding the network device 105 or system 200 from outputting a pause frame to an upstream network element when one or more buffers at the network device 105 or system 200 become filled.

If, at 315, the determination is made that no high speed link is supported by the switch, the process 300 may proceed to 325. At 325, pause frames may be enabled. The transmission of pause frames may be enabled at a network device 105 or system 200, for example, by a pause frame control module 225. In embodiments, the pause frame control module 225 may enable a pause frame setting, thereby causing the network device 105 or system 220 to output a pause frame to an upstream network element when one or more buffers at the network device 105 or system 200 become filled.

Figure 4:
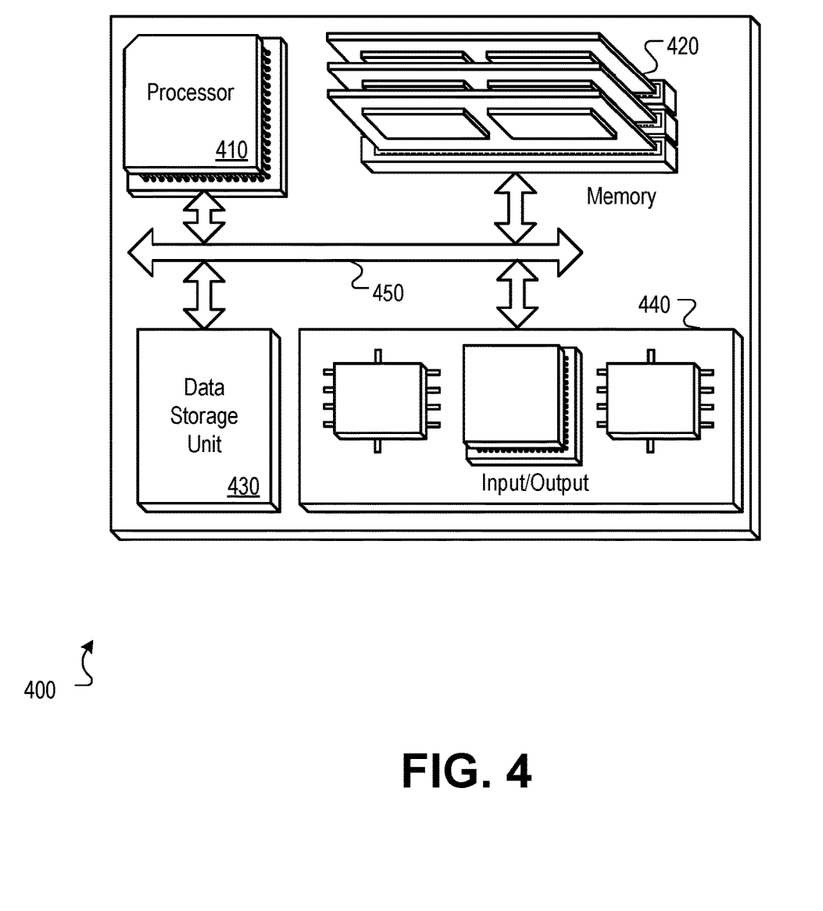
FIG. 4 is a block diagram of a hardware configuration operable to facilitate a dynamic control of a pause frame setting at a network device.

FIG. 4 is a block diagram of a hardware configuration 400 operable to facilitate a dynamic control of a pause frame setting at a network device. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a nonvolatile memory unit.

In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400.

The input/output device 440 provides input/output operations for the hardware configuration 400. In embodiments, the input/output device 440 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 125 of FIG. 1 (e.g., STB, television, computer, tablet, mobile device, etc.). In embodiments, the input/output device can include driver devices configured to send communications to, and receive communications from one or more networks (e.g., local network 120 of FIG. 1, subscriber network 115 of FIG. 1, WAN 110 of FIG. 1, etc.).

Those skilled in the art will appreciate that the invention improves upon methods and systems for dynamically controlling the output of pause frames. Methods, systems, and computer readable media can be operable to facilitate a dynamic control of a pause frame setting at a network device. A network node may monitor for and detect a link or speed change occurring at an interface. When a link or speed change is detected, the network node may take an inventory of one or more links at an associated switch. If at least one of the one or more links are high speed links, the network node may disable the output of pause frames from the network node. If none of the one or more links are high speed links, the network node may enable the output of pause frames from the network node.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of nonvolatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method for controlling a pause frame setting at a network node, the method comprising:
   receiving data at the network node, wherein the data is received from another node;
   identifying each of one or more links of a switch associated with the network node;
   determining a speed associated with each of the identified one or more links;
   if at least one link of the identified one or more links is associated with a speed that is higher than a threshold, disabling an output of pause frames from the network node to the other node; and
   if no link of the identified one or more links is associated with a speed that is higher than the threshold, enabling an output of pause frames from the network node to the other node.

2. The method of claim 1, further comprising:
   detecting a link change at an interface of the network node; and
   wherein each of the one or more links of the switch are identified in response to the detection of the link change at the interface of the network node.

3. The method of claim 2, wherein the interface of the network node comprises an upstream Ethernet port.

4. The method of claim 1, further comprising:
   detecting a speed change at an interface of the network node; and
   wherein each of the one or more links of the switch are identified in response to the detection of the speed change at the interface of the network node.

5. The method of claim 4, wherein the interface of the network node comprises an upstream Ethernet port.

6. The method of claim 1, wherein the one or more links of the switch associated with the network node comprise one or more links between the network node and one or more downstream nodes.

7. The method of claim 1, wherein the switch associated with the network node comprises an external switch.

8. A network node comprising one or more modules that:
   receive data at the network node, wherein the data is received from another node;
   identify each of one or more links of a switch associated with the network node;
   determine a speed associated with each of the identified one or more links;
   if at least one link of the identified one or more links is associated with a speed that is higher than a threshold, disable an output of pause frames from the network node to the other node; and
   if no link of the identified one or more links is associated with a speed that is higher than the threshold, enable an output of pause frames from the network node to the other node.

9. The network node of claim 8, wherein the one or more modules:
   detect a link change at an interface of the network node; and
   wherein each of the one or more links of the switch are identified in response to the detection of the link change at the interface of the network node.

10. The network node of claim 9, wherein the interface of the network node comprises an upstream Ethernet port.

11. The network node of claim 8, wherein the one or more modules:
    detect a speed change at an interface of the network node; and
    wherein each of the one or more links of the switch are identified in response to the detection of the speed change at the interface of the network node.

12. The network node of claim 11, wherein the interface of the network node comprises an upstream Ethernet port.

13. The network node of claim 8, wherein the one or more links of the switch associated with the network node comprise one or more links between the network node and one or more downstream nodes.

14. One or more non-transitory computer readable media having instructions operable to cause one or more processors to perform the operations comprising:
    receiving data at the network node, wherein the data is received from another node;
    identifying each of one or more links of a switch associated with the network node;
    determining a speed associated with each of the identified one or more links;
    if at least one link of the identified one or more links is associated with a speed that is higher than a threshold, disabling an output of pause frames from the network node to the other node; and
    if no link of the identified one or more links is associated with a speed that is higher than the threshold, enabling an output of pause frames from the network node to the other node.

15. The one or more non-transitory computer-readable media of claim 14, wherein the instructions are further operable to cause one or more processors to perform the operations comprising:
    detecting a link change at an interface of the network node; and
    wherein each of the one or more links of the switch are identified in response to the detection of the link change at the interface of the network node.

16. The one or more non-transitory computer-readable media of claim 15, wherein the interface of the network node comprises an upstream Ethernet port.

17. The one or more non-transitory computer-readable media of claim 14, wherein the instructions are further operable to cause one or more processors to perform the operations comprising:
    detecting a speed change at an interface of the network node; and
    wherein each of the one or more links of the switch are identified in response to the detection of the speed change at the interface of the network node.

18. The one or more non-transitory computer-readable media of claim 17, wherein the interface of the network node comprises an upstream Ethernet port.

19. The one or more non-transitory computer-readable media of claim 14, wherein the one or more links of the switch associated with the network node comprise one or more links between the network node and one or more downstream nodes.

20. The one or more non-transitory computer-readable media of claim 14, wherein the switch associated with the network node comprises an external switch.

* * * * *